United States Patent

Essien et al.

[11] Patent Number: 6,075,220
[45] Date of Patent: Jun. 13, 2000

[54] OPTICAL PENETRATION SENSOR FOR PULSED LASER WELDING

[75] Inventors: Marcelino Essien; David M. Keicher; M. Eric Schlienger; James L. Jellison, all of Albuquerque, N. Mex.

[73] Assignee: Sandia Corporation, Albuquerque, N. Mex.

[21] Appl. No.: 09/135,513

[22] Filed: Feb. 12, 1998

[51] Int. Cl.⁷ .................................................. B23K 26/00
[52] U.S. Cl. ............................. 219/121.63; 219/121.64; 219/121.83
[58] Field of Search ...................... 219/121.63, 121.64, 219/121.83

[56] References Cited

U.S. PATENT DOCUMENTS

| | | | |
|---|---|---|---|
| 4,767,911 | 8/1988 | Maram et al. | 219/130.01 |
| 5,045,669 | 9/1991 | Oritz, Jr. et al. | 219/121.83 |
| 5,155,329 | 10/1992 | Terada et al. | 219/121.83 |
| 5,674,415 | 10/1997 | Leong et al. | 219/121.64 |
| 5,681,490 | 10/1997 | Chang | 219/121.64 |
| 5,869,805 | 2/1999 | Beyer et al. | 219/121.83 |
| 5,961,859 | 10/1999 | Chou et al. | 219/121.63 |

FOREIGN PATENT DOCUMENTS

| | | | |
|---|---|---|---|
| 4039303 | 6/1992 | Germany. | |
| 63-130272 | 6/1988 | Japan | 219/121.83 |

*Primary Examiner*—Geoffrey S. Evans
*Attorney, Agent, or Firm*—Elmer A. Klavetter

[57] ABSTRACT

An apparatus and method for determining the penetration of the weld pool created from pulsed laser welding and more particularly to an apparatus and method of utilizing an optical technique to monitor the weld vaporization plume velocity to determine the depth of penetration. A light source directs a beam through a vaporization plume above a weld pool, wherein the plume changes the intensity of the beam, allowing determination of the velocity of the plume. From the velocity of the plume, the depth of the weld is determined.

17 Claims, 4 Drawing Sheets

OPTICAL PENETRATION SENSOR FOR PULSED LASER WELDING

This invention was made with Government support under Contract No. DE-AC04-94AL85000 awarded by the Department of Energy. The Government has certain rights in the invention.

BACKGROUND OF THE INVENTION

This invention relates to an apparatus and method for determining the penetration of the weld created from pulsed laser welding, and more particularly, to an apparatus and method of utilizing an optical technique to monitor the weld vaporization plume velocity to determine the depth of penetration.

Laser processing of metals is widely used in many industries, with the capability to monitor and control the depth of the weld into the metal crucial in many applications, such as nuclear safety critical welds.

In a laser welding process, the laser radiation first heats the metal surface. Melting occurs next, producing a plume of vaporized metal atoms and ions above the surface of the weld pool. When the laser energy input into the metal is sufficient, vaporization becomes sufficiently intense so that a void volume, or keyhole, is opened in the weld pool due to the recoil pressure generated by vaporization. During intense vaporization, a recoil pressure is developed due to the momentum change that occurs when metal atoms leave the surface of the weld pool. This recoil pressure is sufficient to cause a depression of the weld pool surface. As the laser intensity increases, this depression forms a void in the weld pool and allows for further penetration of the incident laser into the metal, leading to deep penetration welding. We refer to the regime of laser welding in which a void is formed and maintained in the weld pool during some fraction of the laser pulse as penetration, or keyhole, welding. In a pulsed laser welding process, the laser energy is delivered to the workpiece or part in short time intervals of approximately of 4–20 milliseconds. During each pulse, a vaporization plume is generated directly above the keyhole.

Several techniques, both non-optical and optical, have been disclosed for determining the state of penetration of a weld pool. Leong and Hunter, in U.S. Pat. No. 5,674,415 issued on Oct. 7, 1997, disclose a non-optical technique where an infrared signature emitted by a hot weld surface during welding is detected and the signature compared with a signature emitted during steady state conditions. This result in correlated with weld penetration.

Ortiz and Schneiter, in U.S. Pat. No. 5,045,669, issued on Sep. 3, 1991, disclose a laser apparatus that includes an optical sensor on the root side of the weld joint with a means for acoustically monitoring the processing. This technique requires accessibility to the root side of the joint.

Maram and Smith, in U.S. Pat. No. 4,767,911, issued on Aug. 30, 1988, disclose an apparatus that utilizes a photo-position detector to monitor the reflection angle of a beam of light specularly reflected from the weld pool to determine the state of penetration.

SUMMARY OF THE INVENTION

The general object of the invention is to determine the depth of penetration of a weld pool in solid metal during the welding process. More particularly, this invention provides an apparatus and method to determine weld penetration depth utilizing measurement of the vaporization plume velocity above the weld pool.

In accordance with the present invention, it is an object of the invention to provide an apparatus for real-time determination of the depth of penetration of the weld, comprising means for applying a pulsed laser beam to a workpiece to form a weld, means to generate a measurement light beam at a known distance above the weld, said light beam being attenuated by the presence of a rising vaporization plume above the weld, means to detect said light beam for measuring a change in light intensity caused by the plume and generating an electrical output signal, means for analyzing said electrical output signal to determine the velocity of said vaporization plume, said velocity being function of the depth of penetration of the weld.

Another object of the invention is the additional means for controlling the welding process based upon the determined state of penetration of the weld pool.

Another object of the invention is to provide a method for real-time determination of the depth of penetration of the weld, comprising the steps of applying a pulsed laser beam to a workpiece to form a weld, generating a measurement light beam at a known distance above the weld, said light beam being attenuated by the presence of a rising vaporization plume above the weld, detecting said light beam to measure a change in light intensity caused by the plume and generating an electrical output signal, and analyzing said electrical output signal to determine the velocity of said vaporization plume, said velocity being a function of the depth of penetration of the weld.

Utilization of the optical apparatus and method of the present invention to determine the vaporization plume velocities and subsequently the depth of weld penetration provides an easy and efficient real-time, optical monitoring sensor for pulsed laser welding without the need for complicated techniques involved with prior art weld penetration monitoring methods.

Other objects, advantages and novel features of the present invention will become apparent from the following detailed description of the invention when considered in conjunction with the accompanying drawings.

DETAILED DESCRIPTION OF THE INVENTION

Figure 1:
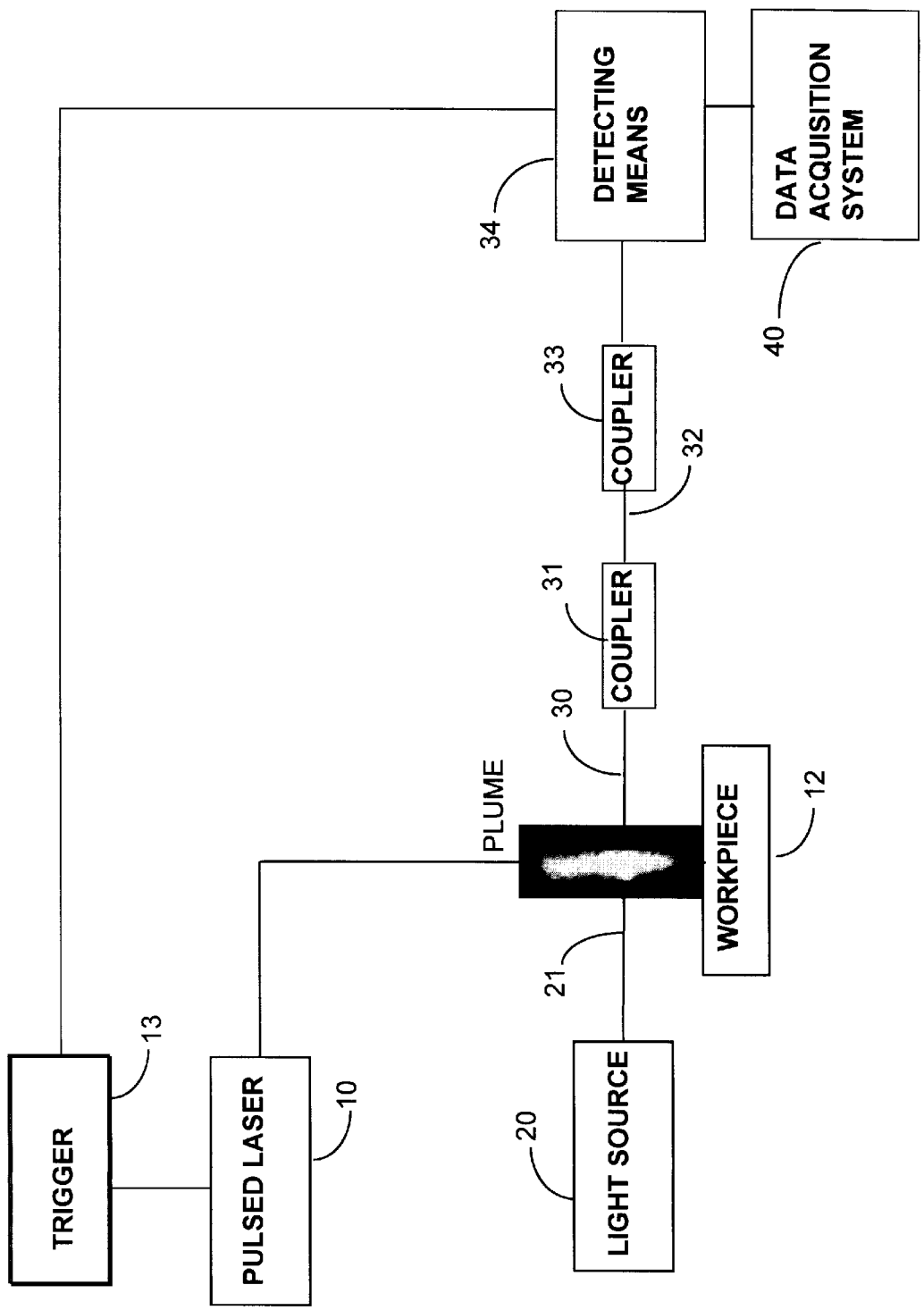
FIG. 1 is a schematic of the system arrangement of the present invention.

FIG. 1 of the drawings shows a laser 10, such as a flash lamp pumped laser. Preferred is a Nd:YAG or $CO_2$ pumped laser. Flash lamp pumped lasers are preferred because they have a high energy density, a large depth of field that does not require refocusing between pulses, and a high beam quality. Laser 10 is focused on a workpiece 12. The beam from the laser may be focused directly on the workpiece or may be transmitted through an optical fiber to the workpiece. The laser radiation first heats the metal surface. Melting occurs next, producing a plume of vaporized metal atoms and ions above the surface of the weld pool. When the laser energy input into the metal is sufficient, vaporization becomes sufficiently intense so that a void volume, or keyhole, is opened in the weld pool.

A light source 20, preferably a laser, produces a directed light beam 21 through the rising vaporization plume directly (usually between 0 to about 4 centimeters) above the weld and keyhole of the workpiece 12. As the light beam 21 from the light source 20, for example a helium-neon laser or diode laser, passes through the rising vaporization plume, the light beam is deviated due to the refractive index gradients in the vaporization plume and the sheath of air surrounding the plume, producing a change in light intensity and a deviated light beam 30. An optical fiber input coupler 31 is utilized to couple the light beam 30 into an optical fiber 32. The optical fiber 32 is coupled to an optical fiber output coupler 33 to direct the light beam 30 to a detecting means 34, for example a silicon photodiode, infrared detector, photomultiplier tube, or imaging detector such as a charge coupled device, to measure the deviated intensity of the light source. The detecting means 34 produces an output voltage proportional to the intensity of the beam 30 to a digital or analog data acquisition system 40.

Laser 10 is connected to a trigger 13 which is connected to the detecting means 34. When the laser 10 delivers energy to the workpiece 12, the trigger 13 is activated and provides an output signal to the detecting means 34. The detecting means 34 is activated by this output signal, detecting initially the intensity of the beam 30 before the formation of the vaporization plume and then detecting, after some time interval, the change in intensity of the beam 30 as the vaporization plume forms and rises above the weld.

The detecting means 34 is connected to a digital or analog data acquisition system 40. One function of the data acquisition system 40 is to determine the time interval between the initiation of the laser pulse on the workpiece 12 as signaled by the detecting means 34 and the time in a step change in the intensity of the light beam 30 as indicated by the detecting means 34. By dividing the distance of the light beam 21 above the workpiece 12 by this time interval, the velocity of the vaporization plume is calculated by the data acquisition system 40.

The depth of the keyhole is related to the velocity of the vaporization plume by the energy balance equation. The energy balance equation shows that the weld radius and depth is proportional to the plume velocity. This equation is given by $$(c_1 A_1/V_p)^{1/2} = a + bv \quad (1)$$

where a and b are constants, $V_p$ is the volume of the keyhole void, $A_1$ is related to the area of the weld and v is the plume velocity. Therefore, measurement of the plume velocity provides information on the weld depth.

In one embodiment of the invention, a pulse from a Nd:YAG laser 10 initiates the trigger 13, with the signal simultaneously sent to the data acquisition system 40 to fix the time of weld initiation. The triggered laser pulse results in weld penetration of the workpiece 12 and production and increased depth of a keyhole. A light source 20, in this embodiment a helium-neon laser, directs a light beam 21 through the vaporization plume directly over the workpiece 12 and formed keyhole. The light beam 21 intersects the vaporization plume a measured distance directly over the keyhole, and preferably within 0 to about 4 centimeters from the workpiece 12. Compared to the time period prior to initiation of the laser pulse, the intensity of the light beam 21 is changed, or deviated, because of vaporization plume containing the vaporized metal atoms or ions. The deviated light beam 30 from the vaporization plume is directed to an optical fiber input coupler 31 to couple the light beam 30 to an optical fiber 32. The deviated light beam 30 is transmitted through the optical cable into an optical fiber output coupler 33 to direct the light beam 30 to a detecting means 34. This detecting means is preferably a silicon photodiode and measures the intensity of the light beam 30. The detecting means 34 produces an output voltage proportional to the intensity and transmits this data to the data acquisition system 40. The data acquisition system 40 determines the velocity of the plume by dividing the distance of travel of the plume as determined by dividing the measured distance of the directed light beam 21 above the workpiece 12 by the time interval from the time of initiation of the laser pulse to the time when a change in intensity is detected by the detecting means 34. The depth of the keyhole is determined from the velocity of the vaporization plume using Equation 1. The pulsed laser 10 may be controlled by the data a acquisition system 40 using this information to obtain a precise depth.

Figure 2:
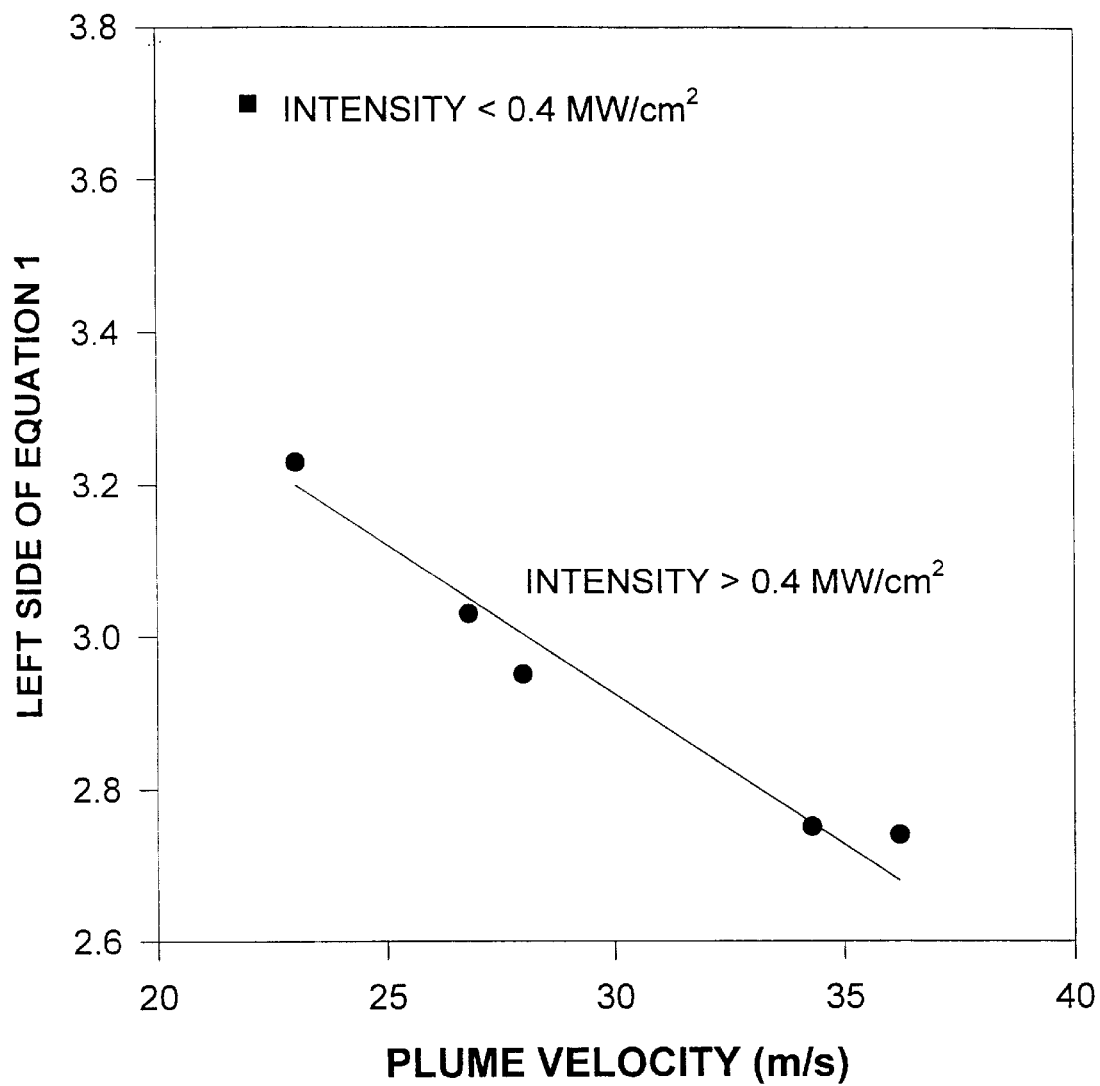
FIG. 2 shows typical results from Nd:YAG spot welds on an iron-nickel alloy.

FIG. 2 shows the results from one embodiment of the present invention. Nd:YAG spot welds were made on workpiece 12 samples of an iron-nickel alloy. The system used in making the measurements utilized a Nd:YAG laser 10 with an intensity greater than 0.4 MW/cm$^2$. The laser was successively operated for discrete time periods of approximately 4 to 20 milliseconds until the desired weld depth was achieved. The light source 20 was a helium-neon laser. The detecting means 34 used was a silicon photodiode. FIG. 2 shows that Equation 1 can be used to linearly relate plume velocity to keyhole weld penetration depth. In FIG. 2, the left side of Equation 1 is plotted as a function of plume velocity. Plume velocities are typically between about 20 to about 40 m/s.

Figure 3:
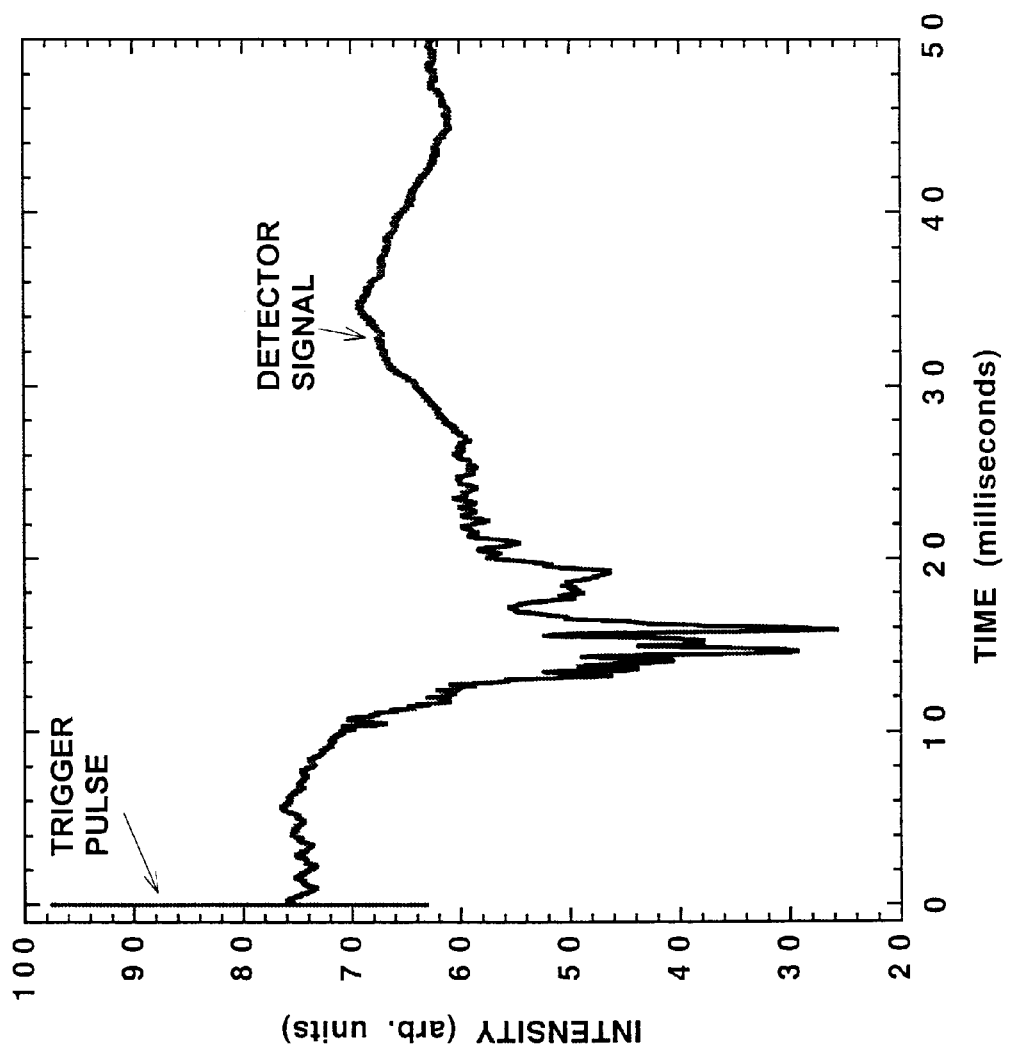
FIG. 3 shows simulated detector response output to the data acquisition system.
Figure 4:
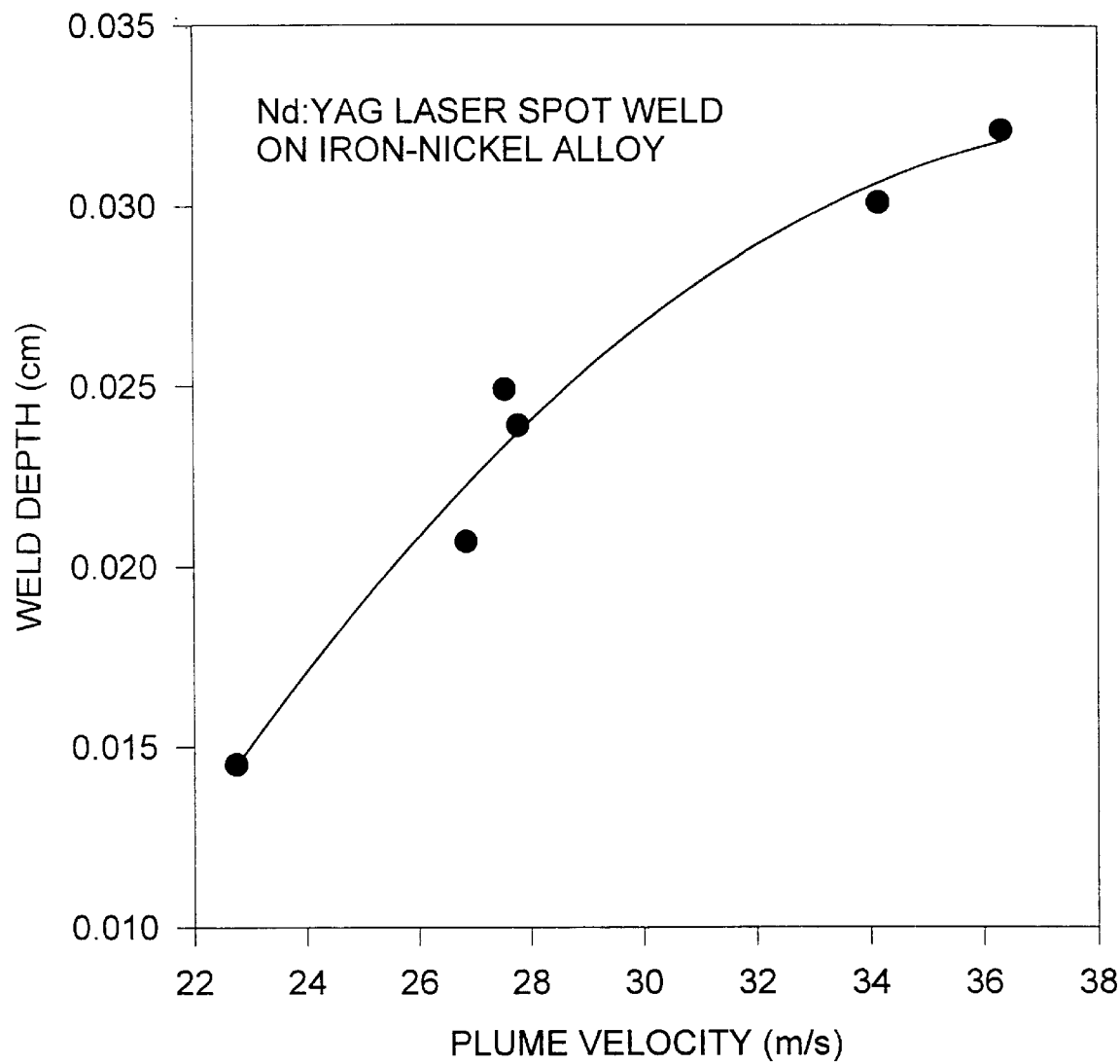
FIG. 4 shows typical results of weld depth as a function of vaporization plume velocity.

FIG. 3 shows a typical response from the detecting means 34 from prior to initiation of the laser pulse to after detection of the vaporization plume. Based on the penetration depth as determined by the present invention, the data acquisition system can be used to terminate the Nd:YAG laser pulses at the desired weld depth. FIG. 4 shows an example of the determined weld depth as a function of vaporization plume velocity for the test spot welds from the operation of this embodiment.

The foregoing discussion discloses and describes only certain exemplary embodiments of the present invention. One skilled in the art will readily recognize from such discussion, and from the accompanying drawings and claims, that various changes and modifications can be made therein without departing from the spirit and scope of the invention as defined in the following claims.

We claim:

1. An apparatus for real-time determination of the depth of penetration of a weld, comprising:

means for applying a pulsed laser beam to a workpiece to form a weld, said means also producing a trigger pulse at the initiation of the application of the beam;

means to generate a measurement light beam at a known distance above the weld, said light beam being attenuated by the presence of a rising vaporization plume above the weld;

means to detect said light beam for measuring a change in light intensity caused by the plume and generating an electrical output signal; and means for analyzing said electrical output signal to determine the velocity of said vaporization plume by dividing said known distance by the time between the trigger pulse and the generation of the electrical output signal, said velocity being a function of the depth of penetration of the weld.

2. The apparatus of claim 1 wherein the means to generate a measurement light through the vaporization plume is a laser.

3. The apparatus of claim 1 wherein the means to generate a measurement light through the vaporization plume is a neon-helium laser.

4. The apparatus of claim 1 wherein the means for applying a pulsed laser beam to a workpiece is a Nd:YAG laser.

5. The apparatus of claim 1 wherein the means for applying a pulsed laser beam to a workpiece is a $CO_2$ laser.

6. The apparatus of claim 1 wherein the known distance is between 0 and about 4 centimeters above the workpiece.

7. The apparatus of claim 1 wherein the pulsed laser has an intensity greater than 0.4 $MW/cm^2$.

8. The apparatus of claim 1 further comprising means for controlling the initiation of the pulsed laser beam.

9. The apparatus of claim 1 wherein the means to detect the light for measuring a change in light intensity is a silicon photodiode.

10. The apparatus of claim 1 wherein the means to detect the light beam for measuring a change in light intensity is a photomultiplier tube.

11. The apparatus of claim 1 wherein the means to detect the light for measuring a change in light intensity is a charge coupled device for determining the presence of the vaporization plume.

12. The apparatus of claim 1 wherein the velocity of the vaporization plume is proportional to the depth of the weld.

13. A method for real-time determination of the depth of penetration of the weld, comprising the steps of:

applying a pulsed laser beam to a workpiece to form a weld and simultaneously generating a trigger pulse at the application of the pulsed laser beam;

generating a measurement light beam at a known distance above the weld, said light beam being attenuated by the presence of a rising vaporization plume above the weld;

detecting said light beam to measure a change in light intensity caused by the plume and generating an electrical output signal; and analyzing said electrical output signal to determine the velocity of said vaporization plume by dividing the known distance by the elapsed time between the trigger pulse and the generation of the electrical output signal, said velocity being a function of the depth of penetration of the weld.

14. The method of claim 13 wherein the step of generating a light through a vaporization plume utilizes a helium-neon laser.

15. The method of claim 13 wherein the pulsed laser beam has an intensity greater than 0.4 $MW/cm^2$.

16. The method of claim 13 comprising the additional step of controlling the operation of the pulsed laser beam.

17. The method of claim 13 wherein the velocity of the vaporization plume is proportional to the depth of the weld.

* * * * *